United States Patent
Jain et al.

(10) Patent No.: US 6,330,229 B1
(45) Date of Patent: Dec. 11, 2001

(54) SPANNING TREE WITH RAPID FORWARDING DATABASE UPDATES

(75) Inventors: Vipin K. Jain, Santa Clara; Michael John Seaman, Mountain View, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/188,852

(22) Filed: Nov. 9, 1998

(51) Int. Cl.$^7$ .................................................. H04L 12/54
(52) U.S. Cl. ............................................. 370/256; 370/401
(58) Field of Search ................................... 370/401, 408, 370/256, 255, 428; 709/239, 242

(56) References Cited

U.S. PATENT DOCUMENTS

| | | | |
|---|---|---|---|
| 5,309,437 | 5/1994 | Perlman et al. | 370/85.13 |
| 5,606,669 | 2/1997 | Bertin et al. | 395/200.15 |
| 5,649,109 | * 7/1997 | Griesmer . | |
| 5,761,435 | 6/1998 | Fukuda et al. | 395/200.68 |
| 5,790,808 | * 8/1998 | Seaman . | |
| 6,032,194 | * 2/2000 | Gai et al. | 709/239 |

OTHER PUBLICATIONS

"Media Access Control (MAC) Bridges", IEEE Standard 802.1D, Institute of Electrical and Electronics Engineers, Inc., New Yor, Mar. 8, 1991, pp. 49–127.

* cited by examiner

Primary Examiner—Douglas Olms
Assistant Examiner—Ken Vanderpuye
(74) Attorney, Agent, or Firm—McDonnell Boehnen Hulbert & Berghoff

(57) ABSTRACT

Management of forwarding databases in the case of link failures on bridges according to the all improved spanning tree, limits the propagation of notifications of topology change to only those parts of the network which are affected by the link failures, and trigger partial flushing as opposed to complete forwarding database flushing of learned MAC addresses to relearn the sets of addresses associated with ports affected by the change in topology. When a bridge moves its root port to a new port, the bridge can move the addresses learned through the original root port to the new root port without any relearning. The sets of addresses associated with the designated ports on upstream bridges from the old root port, are subject to flushing. Also when the bridge attaches to the new branch, it triggers a message to the root instructing all bridges in the new path to the root to flush addresses learned on their root ports.

45 Claims, 8 Drawing Sheets

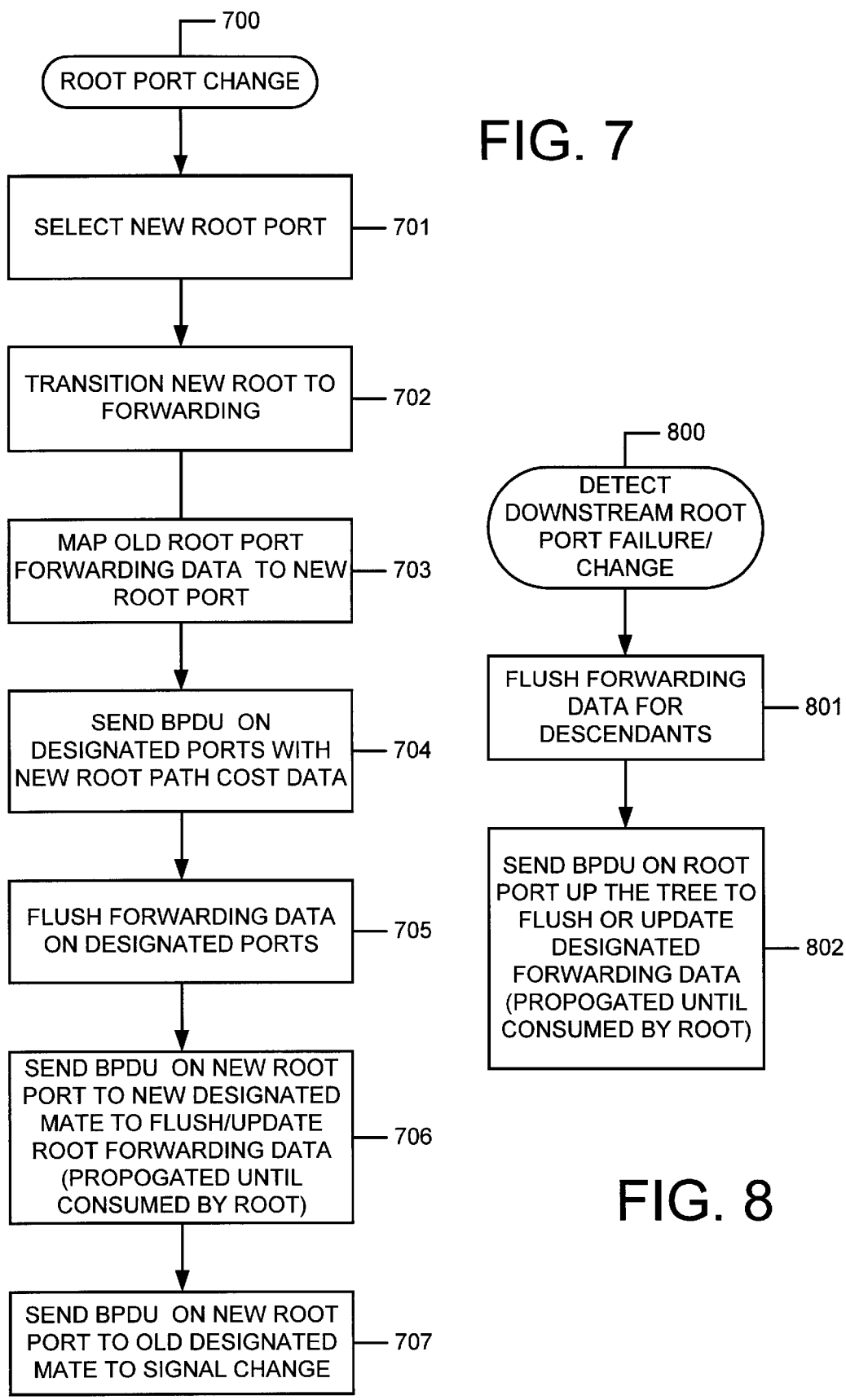

PORT ROLES AND STATES, WITH ENHANCED TRANSITIONS FOR POINT-TO-POINT NETWORKS ONLY

| PORT ROLE | DISABLED PORT | ROOT PORT | DESIGNATED PORT | | | | ALTERNATE PORT |
|---|---|---|---|---|---|---|---|
| PORT STATE | DISABLED | FORWARDING | LISTENING | LEARNING | FORWARDING | BLOCKING |
| FORWARDING? | NO | YES | NO | NO | YES | NO |
| LEARNING? | NO | YES | NO | YES | YES | NO |
| EVENTS | | | TRANSITIONS | | | | |
| BECOME DISABLED | X | DISABLED | DISABLED | DISABLED | DISABLED | DISABLED |
| BECOME ROOT PORT | X | X | ROOT PORT FORWARDING | ROOT PORT FORWARDING | ROOT PORT FORWARDING | ROOT PORT FORWARDING |
| BECOME DESIGNATED1[10] | DESIGNATED LISTENING[a] | DESIGNATED LISTENING[a] | X | X | X | DESIGNATED LISTENING |
| BECOME DESIGNATED2[11] | DESIGNATED LISTENING[a] | DESIGNATED FORWARDING | X | X | X | DESIGNATED LISTENING |
| BECOME ALTERNATE[12] | X | ALTERNATE BLOCKING | ALTERNATE BLOCKING[d] | ALTERNATE BLOCKING[d] | ALTERNATE BLOCKING | X |
| FORWARD DELAY TIMER EXPIRY | X | X | DESIGNATED LEARNING[a] | DESIGNATED FORWARDING | X | X |

FIG. 9A

PORT STATES, WITH ENHANCED TRANSITIONS FOR POINT-TO-POINT NETWORKS ONLY

| PORT STATE | DISABLED | LISTENING | LEARNING | FORWARDING | BLOCKING |
|---|---|---|---|---|---|
| FORWARDING? | NO | NO | NO | YES | NO |
| LEARNING? | NO | NO | YES | YES | NO |
| EVENTS | | TRANSITIONS | | | |
| BECOME DISABLED | X | DISABLED | DISABLED | DISABLED | DISABLED |
| BECOME ROOT PORT | X | FORWARDING | FORWARDING | — | FORWARDING |
| BECOME DESIGNATED1 | LISTENING[a] | — | — | — | LISTENING[a] |
| BECOME DESIGNATED2 | LISTENING[a] | — | — | — | LISTENING[a] |
| BECOME ALTERNATE | X | BLOCKING[d] | BLOCKING[d] | BLOCKING | X |
| FORWARD DELAY TIMER EXPIRY | X | LEARNING[a] | FORWARDING | X | X |

FIG. 9B

SPANNING TREE WITH RAPID FORWARDING DATABASE UPDATES

RELATED APPLICATION DATA

The present application is related to co-pending U.S. patent application Ser. No. 09/141,803, entitled HIGH AVAILABILITY SPANNING TREE WITH RAPID RECONFIGURATION, filed on Aug. 28, 1998, by the same inventors, which was owned at the time of invention and is currently owned by the same assignee, and which is hereby incorporated by reference as if fully set forth herein.

BACKGROUND OF THE INVENTION

1. Field of the Invention

The present invention relates to network protocols and network intermediate devices executing such protocols; and more particularly to algorithms for managing a tree of network devices for a data network according to a spanning tree protocol.

2. Description of Related Art

Local area networks LANs specified according to IEEE Standards for Local and Metropolitan Area Networks under section 802.x, of all types may be connected together with media access control MAC bridges. Bridges interconnect LAN segments so that stations connected to the LANs operate as if they were attached to a single LAN. The MAC bridge according to the IEEE standards is specified for operating below the MAC service boundary, and is transparent to protocols operating above this boundary, including protocols operating in the logical link control sublayer or the network layer. Thus, a bridged local area network provides for interconnection of stations attached to LAN segments of different MAC types, for increases in the physical extent, the number of permissible attachments and the total performance of a LAN, and for the partitioning of a physical LAN support for administrative or maintenance reasons. The MAC bridge is specified according to the IEEE Standard 802.1D (IEEE Std 802.1D-1990, IEEE Standards for Local and Metropolitan Area Networks: Media Access Control (MAC) Bridges, which is incorporated herein by reference.

When a bridged network is established, it is possible to create loops in the network caused by providing more than one path through bridges and LAN segments between two points. Thus, according to the 802.1D standard, an active topology for the bridge network is maintained according to the spanning tree protocol which is described in the standard. The spanning tree protocol automatically establishes fully connected (spanning) and loop-free (tree) bridged network topology. It uses a distributed algorithm that selects a root bridge and the shortest path to that root from each LAN. Tie breakers are used to ensure that there is a unique shortest path to the root, while uniqueness of the root is guaranteed by using one of its MAC addresses as part of a priority identifier.

Every LAN in the network has one and only one "designated port" providing that LANs shortest path to the root, through the bridge at which the designated port is a part. The bridge is known as the designated bridge for that LAN.

A bridge other than the root bridge at the root of the network, can be termed a branch bridge. Every branch bridge has a "root port" which is the port providing that bridges shortest path to the root. Ports other than the root port are designated ports, or alternate ports according to the standard. An alternate port is connected to a LAN for which another bridge is the designated bridge, and is placed in a blocking state so that frames are not forwarded through that port.

The connectivity through any bridge is thus between its root port and designated ports. When spanning tree information has been completely distributed and is stable, this connectivity will connect all of the LANs a loop free tree.

According to the spanning tree protocol of the standard, each port on a bridge can assume a blocking state in which frames are not forwarded through the port, a forwarding state in which frames are forwarded through the port. For a transition from the blocking state to the forwarding state, the protocol requires the port to proceed through transitional states referred to as the listening state and the learning state. In the listening state, the port is preparing to participate in frame relay, however frame relay is temporarily disabled to prevent temporary loops. In the listening state, the port monitors information related to the topology in the network for an interval referred to as the forward delay timer. If no information is received which causes a change in state of the port before expiry of the forward delay timer, then the port transitions to the learning state.

In the learning state, the port continues to prepare for participation in frame relay. The relay is temporarily disabled to prevent loops. In this state, in addition to monitoring bridge protocol data units and other information related to operation of the spanning tree algorithm, the port learns information about end stations that are accessible through the port for use in the forwarding of frames once the port enters the forwarding state. Upon expiration of the forward delay timer, if no better information about the protocol is received, then the port assumes the forwarding state. Incoming frames on the port are blocked if their destination address is listed in the forwarding database as accessible through the port, else they are accepted and forwarded on one or more other ports in the forwarding state in the bridge. Thus, the transition from a blocking state to the forwarding state takes at least two times the forward delay timer interval. From the time of detection of a change in topology causing a transition from the blocking to the forwarding state, until the time in which the forwarding state is assumed can be a significant amount of time, as much as 30 seconds in some cases.

In a network of bridges which have a topology managed according to the spanning tree protocol, whenever a bridge detects a change in topology, such as for example when an active link fails, the bridge notifies the root of the active topology with a bridge protocol data unit BPDU packet. The protocol entity at the root of the topology then communicates the change to all of the bridges in the tree. Upon receiving such a notification, the bridges time-out their forwarding databases on all ports, recreate the topology and relearn the MAC addresses for the forwarding databases. While the bridges are in the process of recreating the spanning tree topology and relearning MAC addresses, data packets are not forwarded by them. This causes network disconnectivity as the ports transitioning go through the listening and learning states, followed by data flooding after the ports enter the forwarding state but before the forwarding databases have been completely relearned. The flooding of the network after a transition can result in loss of performance. Such loss of performance can be critical in real time networks, such as those transmitting live audio, video or other real time messages such as telephone signals.

Accordingly, it is desirable to provide a technique for improving the management of the forwarding databases in bridges operating according to the spanning tree protocol.

SUMMARY OF THE INVENTION

The present invention addresses the problems of management of forwarding databases in the case of topology changes, such as those caused by link failures on bridges, in response to the changing roles of ports on the bridge. The invention limits the propagation of notifications of topology change to only those parts of the network which are affected by the changes, and triggers partial flushing, as opposed to complete flushing, of learned MAC addresses, in the forwarding database for the sets of addresses associated with ports affected by the change in topology.

According to the prior art algorithm, when a topology change is detected a topology change notification TCN message is sent towards the root bridge from protocol entities in the network. The root bridge originates a configuration BPDU with a topology change TC flag set. All of the bridges in the network start a fast timeout timer on the MAC address database and start flushing the databases. The algorithm results in flushing databases everywhere in the network independent of the port roles, and results in flushing of data that remains valid, or which could be more efficiently managed. The present invention provides a set of techniques to limit flooding to parts of a database and parts of a network, which can be considered localized flooding. The invention includes the idea of separating the flushing algorithms into a flush designated FD and a flush root FR process. The flush designated and flush root processes involve localization of these processes, ideally to those portions of the network which the change affects, or to less then the entire network according to a localization scheme. There can be successive refinements or stages of refinement according to the present invention including for example sending a flush root message up the destination branch (the branch to which a bridge is newly attached), and sending a flush designated process to everywhere else in the network. In another alternative the flush root process is applied to the destination branch and the flush designated process is applied to limited regions of the network, such as to branches in the network other than the destination branch. According to yet another alternative, the flush root process is applied to the destination branch and the flush designated process is applied only on the path to the root of the source branch, that is only on the path from the bridge to which the bridge undergoing the change had been connected prior to the change.

Thus the invention identifies parts of the forwarding database by port and by the role of the port. Therefore sets of MAC addresses are associated with individual ports and port roles. The invention is capable of being implemented in a backward compatible manner, for example by mapping the messages used for the flush root process to a topology change notification message and mapping the message needed for the flush designated process to a configuration BPDU with a TC flag set.

In addition, the various means of initiating the flush root and flush designated processes based on various failures, loss of connectivity, gaining connectivity, and port role changes are provided.

The present invention thus provides a network device, such as a bridge executing the spanning tree protocol according to the IEEE 802.1D Standard, which includes a plurality of ports coupled to LAN segments in the network. Topology management resources manage the plurality of ports according to the spanning tree algorithm to set an active topology for the plurality of ports. Frames incoming through ports in the plurality of ports are forwarded or blocked depending on the contents of a forwarding database and on the state of the port according to the topology. Thus, a forwarding database is included which stores for the ports in the plurality of ports respective sets of station addresses learned from frames incoming on the respective ports. This set of station addresses is typically learned by monitoring the source address of frames incoming on the port. Those source addresses are added to the set of addresses associated with the port on which they were incoming. Frames received on that port having a destination address in the set of addresses associated in this way with the port are blocked.

According to the present invention, the topology management resources further include logic to compute parameters for managing the active topology. These parameters include an identification of the root of the network, and identification of various roles played by the ports according to the spanning tree algorithm. The port roles include a root port role to be used for a preferred path to root, one or more ports in a designated port role to be used for preferred paths between the root and respective LAN segments coupled to the one or more ports, and identification of one or more ports in the alternate port roles, which are in the blocking state. The forwarding database is updated in response to changes in the port roles. Further, topology management resources include logic to issue notification to other network devices in the network of changes in the port roles in a way that limits propagation of the change notification to less than the entire network, preferably to those bridges which may be affected. Thus, in support of this notification process the topology management resources include logic to update the forwarding database in response to receipt of such notification.

The logic to update the forwarding database includes for a port changing from an alternate port role to a root port role, logic to update the forwarding database by transferring the set of addresses associated with the port in the root port role before the change to the port having the root port role after the change. In response to such a change, the bridges in the source branch of the bridge, that is the branch to which the bridge undergoing the change is connected before the change, will need to correct the respective forwarding databases with respect to the designated port through which the changing bridge was accessible before the change. In addition, bridges on the target branch of the tree, to which the bridge attaches after the change, need to update their forwarding databases with respect to their respective root ports because the bridge after the change will no longer be accessible through the root port, but rather through a designated port in this target branch. Thus, the topology management resources include logic to issue notifications on the appropriate branches of the tree.

Furthermore, after a change in the root port, new root path cost information is generated and propagated on designated ports of the bridge undergoing the change. This may result in a reconfiguration of the bridges that are descendent from the bridge undergoing the change. Thus, the topology management resources include logic to update the set of addresses associated with the designated ports, such as by flushing all of the addresses and allowing relearning, to account for the possibility that the configuration of the descendent bridges will change.

According to another aspect of the present invention, the automatic updating of the forwarding database is combined with the process for immediately changing over from an alternate port role to a root port role in the event of a root port link failure. According to one aspect of the invention, the alternate port which automatically fails over is selected in advance, and provides for very fast configuration of the network.

The benefit of this high availability tree is dramatic when point-to-point links with a "loss of light" or "link beat absent" detection capability interconnect to bridges. Physical failures can be detected and repaired within as little as 10 milliseconds, and the forwarding databases can be actively updated quickly. The present invention also applies to non-point-to-point links, in which bridges are interconnected by a shared media. In the shared media cases, other improvements to the spanning tree algorithm can be used to facilitate rapid detection of a designated port or designated bridge failure.

The present invention provides for an enhancement to the spanning tree protocol based on identifying port roles, and managing updates of the forwarding databases after topology changes, according to the roles of the ports.

Transitions from the blocking to the forwarding state, and from the forwarding to the blocking states depend upon the particular role of the port. After detection of a failure of the root port, a port in the blocking state can immediately assume the root port role, and the forwarding database of the root port before the change can be transferred to the new root port, allowing a rapid change in topology which maintains a high availability tree.

The present invention provides for configuring switched LANs which sustain no more than 15 milliseconds service availability interruption after failure of a switch or a physical link. Also, the present invention allows for migration smoothly from a legacy networks based on the prior art spanning tree protocol to a highly available network without significant additional administrative overhead. Thus, the spanning tree report can be moved and start forwarding frames immediately if the previous root port no longer forwards frames, such as in the case of a physical link failure. The improvement is fully compatible with existing standard switches.

Other aspects and advantages of the present invention can be seen upon review of the figures, the detailed description, and the claims which follow.

BRIEF DESCRIPTION OF THE FIGURES

FIG. 7 illustrates logic in the network device that includes topology management resources according to the present invention.

FIG. 8 illustrates further logic in the network device operating according to the present invention.

FIGS. 9A and 9B illustrate enhanced spanning tree port roles, states and transitions for point-to-point networks according to one aspect of the present invention.

DETAILED DESCRIPTION

Figure 1:
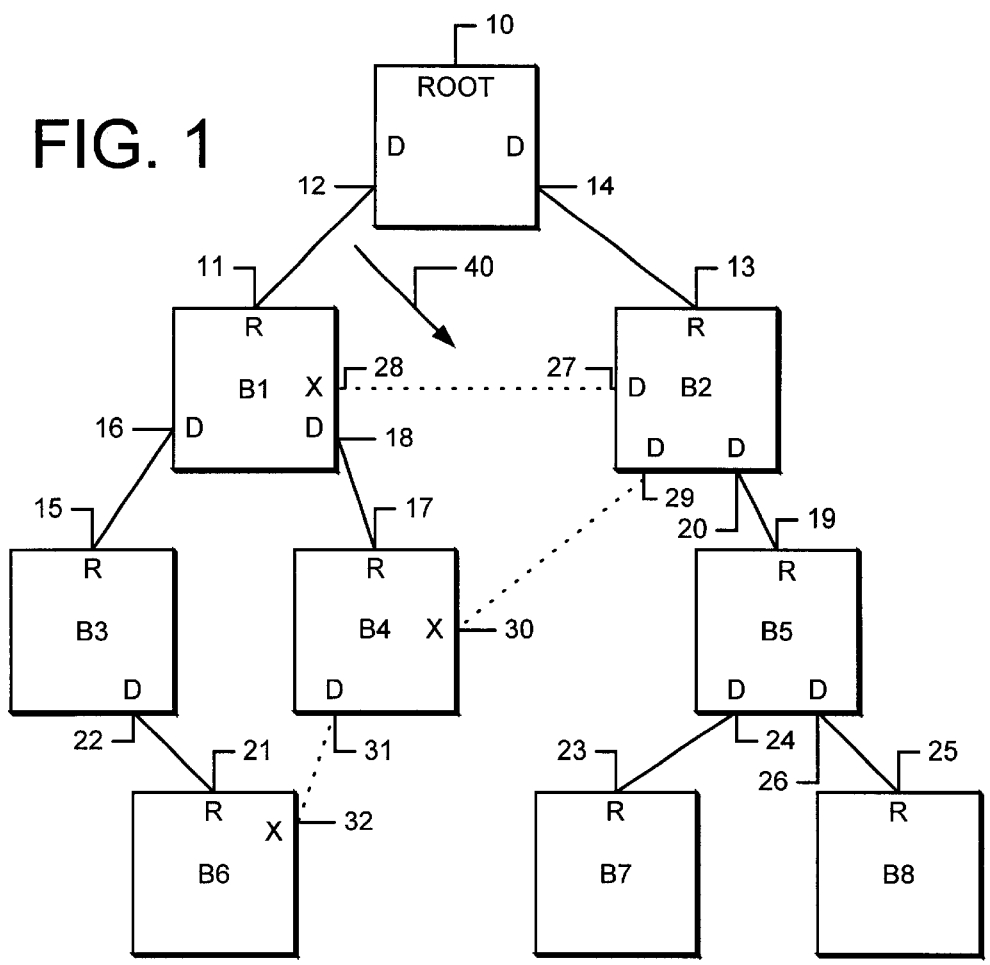
FIG. 1 illustrates a network including a set of bridges managed according to the spanning tree protocol having forwarding database managers that are responsive to port role (R, D, X) according the present invention.

A detailed description of the present invention is provided with respect to the figures, in which FIG. 1 provides perspective for a switched networks in which the improved spanning tree protocol of the present invention is applied to improve service availability in the event of failure of a switch or physical link.

FIG. 1 illustrates a spanning tree topology including a root bridge 10. A bridge B1 which has a root port 11 coupled to a designated port 12 on the root bridge 10. A bridge B2 has a root port 13 coupled to a designated port 14 on the root 10. A bridge B3 has a root port 15 coupled to a designated port 16 on bridge B1. A bridge B4 has a root port 17 coupled to a designated port 18 on bridge B1. A bridge B5 has a root port 19 coupled to a designated port 20 on bridge B2. A bridge B6 has a root port 21 coupled to a designated port 22 on bridge B3. A bridge B7 has a root port 23 coupled to a designated port 24 on bridge B5. A bridge B8 has a root port 25 coupled to a designated port 26 on bridge B5. Active links between the bridges are designated by solid lines in figure. The inactive links, that is links on which at least one port is in the blocking state are illustrated in a dashed line. In the figure, bridge B2 has a designated port 27 which is coupled to an alternate port 28 on bridge B1. Bridge B2 has a designated port 29 coupled to an alternate port 30 on bridge B4. Also, bridge B4 has a designated port 31 coupled to an alternate port 32 on bridge B6.

Figure 2:
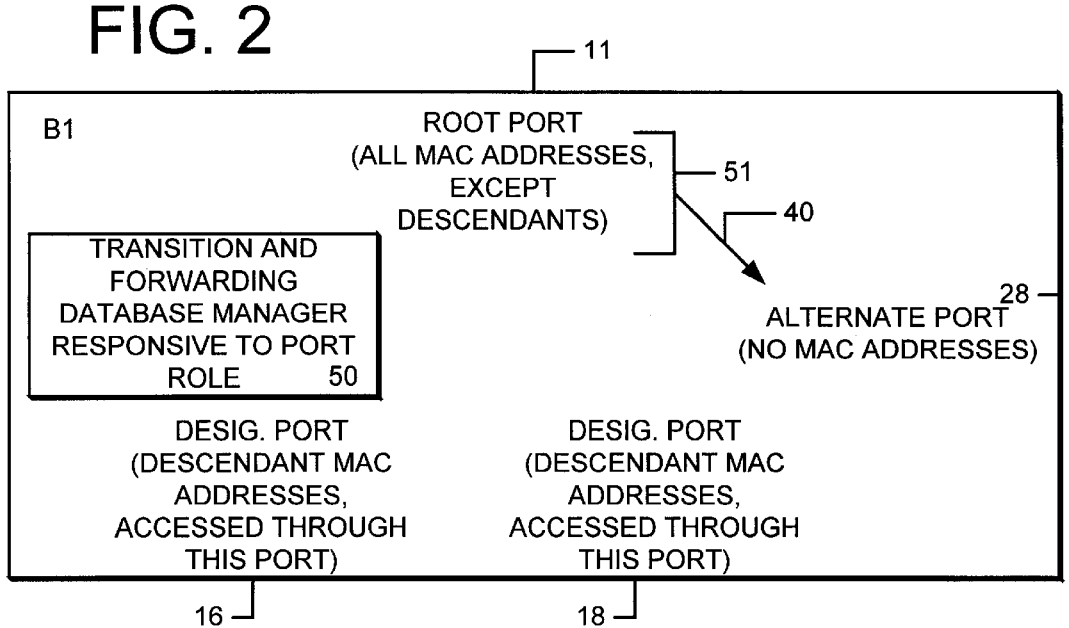
FIG. 2 illustrates a bridge in the network of FIG. 1 for the purpose of demonstrating the process of transferring sets of addresses according to the present invention.

FIG. 2 provides an expanded view of the bridge B1 of FIG. 1. The bridge B1 includes a transition and forwarding database manager 50 that is responsive to port role. Coupled with the root port 11, a set of addresses is stored which potentially includes (subject to learning and time out processes) all MAC addresses in the network except for the MAC addresses of stations accessible through the designated ports 16 and 18. Bridge B1 includes an alternate port 28 which is in the blocking state. The set of addresses associated with the alternate port is the empty set. Also bridge B1 includes designated port 16 and designated port 18. Descendants of bridge B1 are those end stations having MAC addresses accessible through ports 16 and 18 in this configuration. Thus, a set of addresses is coupled with port 16 that includes subject to learning and time out processes the MAC addresses learned from the source addresses of packets incoming on port 16. Also, port 18 has a set of addresses associated with it, which consist of the addresses derived from the source addresses of packets received incoming on port 18 subject to learning and time out processes.

Typically, the set of addresses associated with ports are typically stored in the forwarding database of the bridge entity. The forwarding database also referred to as a "filtering database" in the IEEE 802.1D Standard, is typically configured as a single filtering database object per bridge. The database according to the implementation described in the standard is addressed by the MAC address of the station to which the entry corresponds. The entry includes a port map that lists for each port, if it is an inbound port, the number of the bridge port, and if it is an outbound port, a set of indicators one for each bridge port, which if true permits forwarding to the associated port. The number of an outbound port that represents the inbound port takes the value false. Of course a wide variety of database configurations could be utilized to accomplish this purpose.

According to the present invention, the forwarding database manager responsive to port role 50 is operable during a change in the active topology. For example, if the link between port 11 on bridge B1 and port 12 on the root bridge 10 were to fail, then port 28 in the alternate port role could immediately take over as the root port as reflected by the arrow 40 in FIG. 1 and FIG. 2. In this case, the set of addresses 51 associated with the root port 11 can be transferred within the forwarding database to the alternate port 28 by, for the example given above, changing the inbound port number and outbound port number(s) if any, for the entries in the database. The set of addresses 51 potentially consists of the end stations accessible through the root bridge 10, bridge B2, bridge B5, bridge B7 and bridge B8. This set is the same as was accessible through the root port 11 on bridge B1 prior to the change. Therefore, the set of addresses associated with the new root port need not be relearned. However, the set of addresses associated with the root port 13 in bridge B2 needs to be updated. The end stations accessible through bridges B1, B3, B4 and B6 are no longer accessible through the root port 13 of bridge B2. Rather, these end stations are accessible through the designated port 27. Thus, the set of addresses associated with the root port 13 must be flushed to remove at least the addresses end stations accessible through descendant bridges B1, B3, B4 and B6. This can be accomplished by making the changes directly relying on the forwarding databases in the descendant bridges, or by flushing all addresses associated with the root port. The set of addresses associated with the designated port 14 on the root 10 will be updated to accommodate the change by the learning process. The addresses associated with bridges B5, B7 and B8 need not be changed. Thus, the topology update process does not need to affect bridges B5, B7 and B8.

If bridges B3, B4 and B6 remain configured the same way after the topology change, that is none of the bridges determines that there is a better path to the root bridge 10, then their databases do not be updated either. Also, the set of addresses associated with the designated port 16 and the designated port 18 on bridge B1 would not need updating.

However, it is possible that a bridge descendant from bridge B1 may undergo a topology change. For example, in this case bridge B4 may determine that port 30 provides a lower cost path to the root than port 17 which had the root port role prior to the change. Thus, bridge B4 would reconfigure itself to provide the root port role to port 30, and an alternate port role to port 17. Also, bridge B6 in response to the change in configuration of bridge B6 might change its root port from port 21 to port 32. Designated port 16 on bridge B1 would need to update its list of addresses to eliminate those associated with bridge B6. Thus, according to the present invention the designated ports 16 and 18 are flushed by the forwarding database manager 50 in response to a port role change.

The transition and forwarding database manager responsive to port role 50 in the bridge B1 of FIG. 2 also provides for direct transition from the blocking to the forwarding state for transitions from an alternate role to a root port role in some circumstances. Discussion of this aspect of the invention is provided with respect to FIGS. 9A and 9B and FIG. 10 below.

Figure 3:
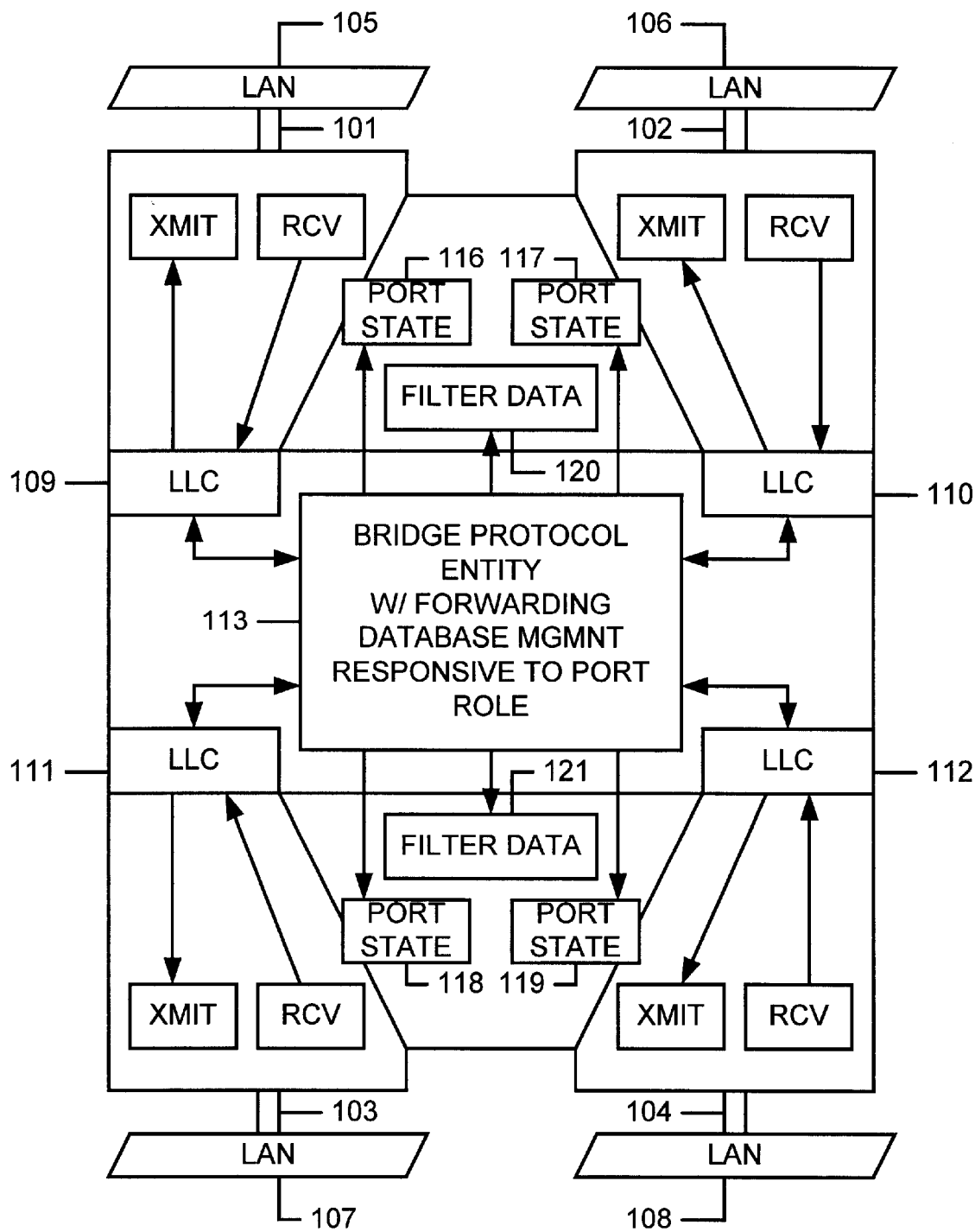
FIG. 3 is a diagram of a bridge according to the present invention with forwarding database management responsive to port role diagramed in the style IEEE 802.1D standard.

FIG. 3 provides a block diagram of the bridge functionality in the spanning tree entities, for example in the devices of FIG. 1. FIG. 3 is drawn in the style adapted in the IEEE 802.1D standard (See FIGS. 3–6 in the Standard), and is enhanced to provide four ports.

Thus, the bridge illustrated in FIG. 3 includes ports 101, 102, 103, and 104. Each of the ports 101–104 is coupled to a respective LAN segment 105–108. The ports support, transmit and receive functionality through respective logical link control layer entities 109–112. The LLC entities 109–112 provide for connection to bridge protocol entity 113 according to the present invention. The bridge protocol entity provides for storing parameters that identify port roles according to the present invention, and for managing transition of port state information, and for managing forwarding database entries for the plurality of ports according to the port role information. Thus, the bridge protocol entity maintains filter data in the forwarding database 120, 121, for frames being transmitted amongst the ports, and port state information 116, 117, 118, and 119 for the respective ports.

According to the present invention, the bridge protocol entity includes an address learning module. Address learning is initiated either immediately, or on expiry of a timer started, on any of the following topology change events: root port failure, receiving inferior information from a designated bridge on the root port, receiving inferior information from a designated bridge on an alternate port, receiving better information on the root port, receiving better information on the designated port, receiving better information on an alternate port, and addition of a link. Examples of basic processes for each event follows:

1. Root Port Failure
    Flush the designated ports on upstream source branch (addresses learned on all designated ports on the originating bridge)
    Flush all the designated ports
    If an alternate port becomes the root port, move addresses from the old root port to the new root port, flush all the root ports on upstream destination root branch (addresses learned on all designated ports on originating bridge).
 2. Receiving Inferior Info From Designated Bridge On The Root Port
    If an alternate port becomes the root port,
       flush the root ports on upstream destination root branch (addresses learned on all designated ports on originating bridge) and flush all the designated ports
    If the old root port becomes an alternate port, move addresses from the old root port to the new root port
    If the old root port becomes a designated port, flush the old root port and start learning addresses on the new root port.
 3. Receiving Inferior Info From Designated Bridge On An Alternate Port
    If the receiving alternate port becomes a designated port, start learning addresses.
 4. Receiving Better Info On The Root Port
    If an alternate port becomes a designated port, start learning addresses.
 5. Receiving Better Info On A Designated Port
    If the receiving designated port becomes the root port, flush the root ports on upstream destination root branch (addresses learned on all designated ports on originating bridge)
    If the old root port becomes an alternate port, move addresses from the old root port to the new root port and flush the designated ports on upstream source root branch (addresses learned on all designated ports on originating bridge)
    If the old root port becomes a designated port, flush the old root port
    If the receiving designated port becomes an alternate port, Flush the receiving designated port and flush the designated ports on upstream source root branch (addresses learned on receiving designated port)

If an alternate port becomes a designated port, start learning addresses.

6. Receiving Better Info On An Alternate Port

If the receiving alternate port becomes the root port, flush the root ports on upstream destination root branch (addresses learned on all designated ports on originating bridge)

If the old root port becomes an alternate port, move addresses from the old root port to the new root port and flush the designated ports on upstream source root branch (addresses learned on all designated ports on originating bridge)

If the old root port becomes a designated port, flush all the learned addresses from the old root port and start learning addresses on the new root port If an alternate port becomes a designated port, start learning addresses.

7. Addition Of A Link

The added port becomes a designated port and starts learning addresses.

Figure 4:
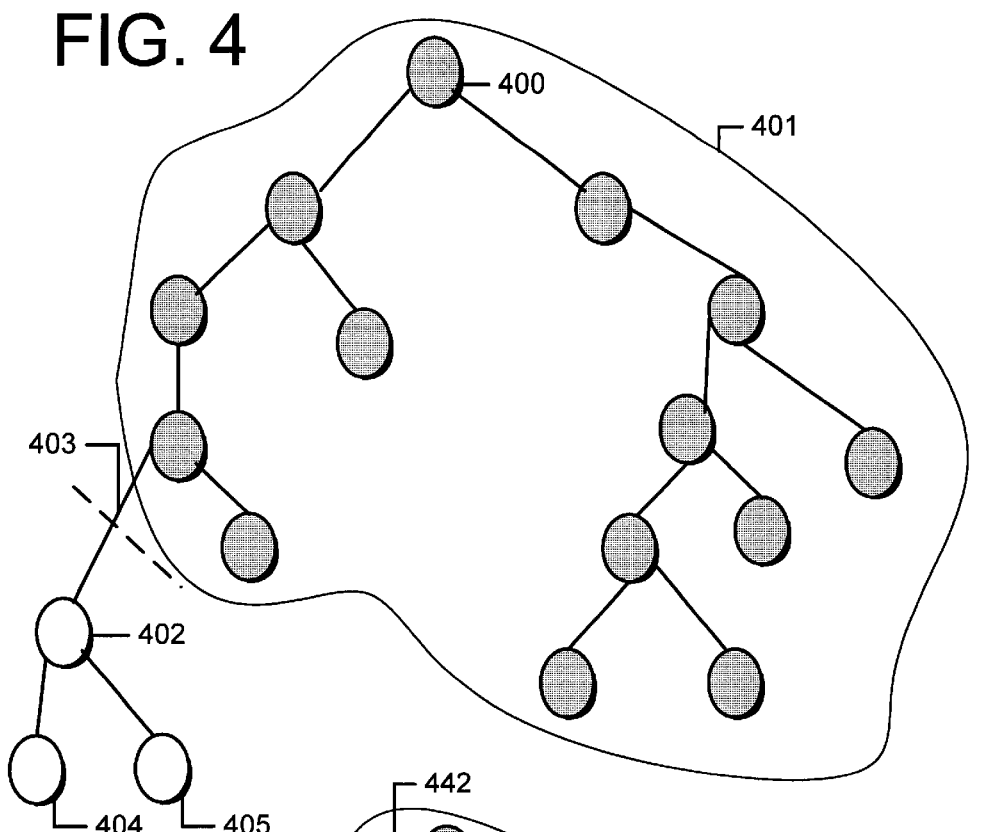
FIG. 4 is a schematic representation of a network managed according to the spanning tree protocol of the present invention.
Figure 5:
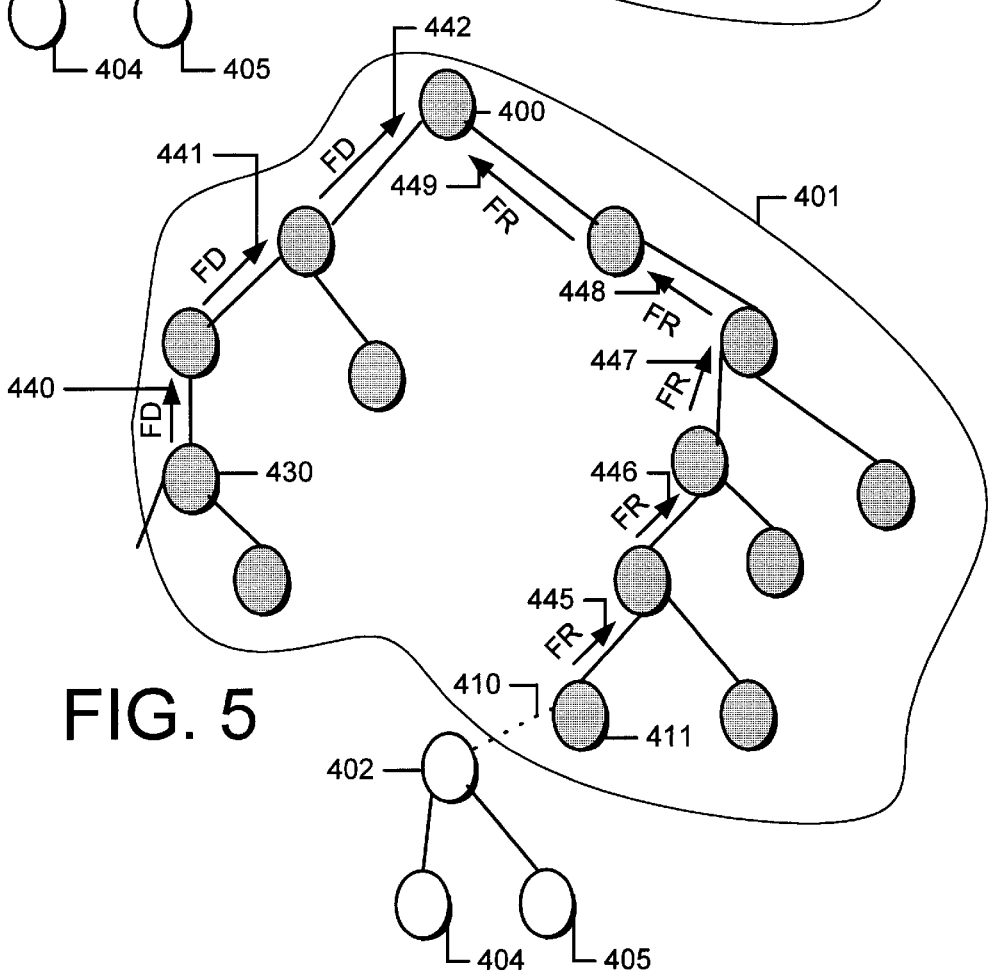
FIG. 5 illustrates a change in topology to be managed according to the present invention.
Figure 6:
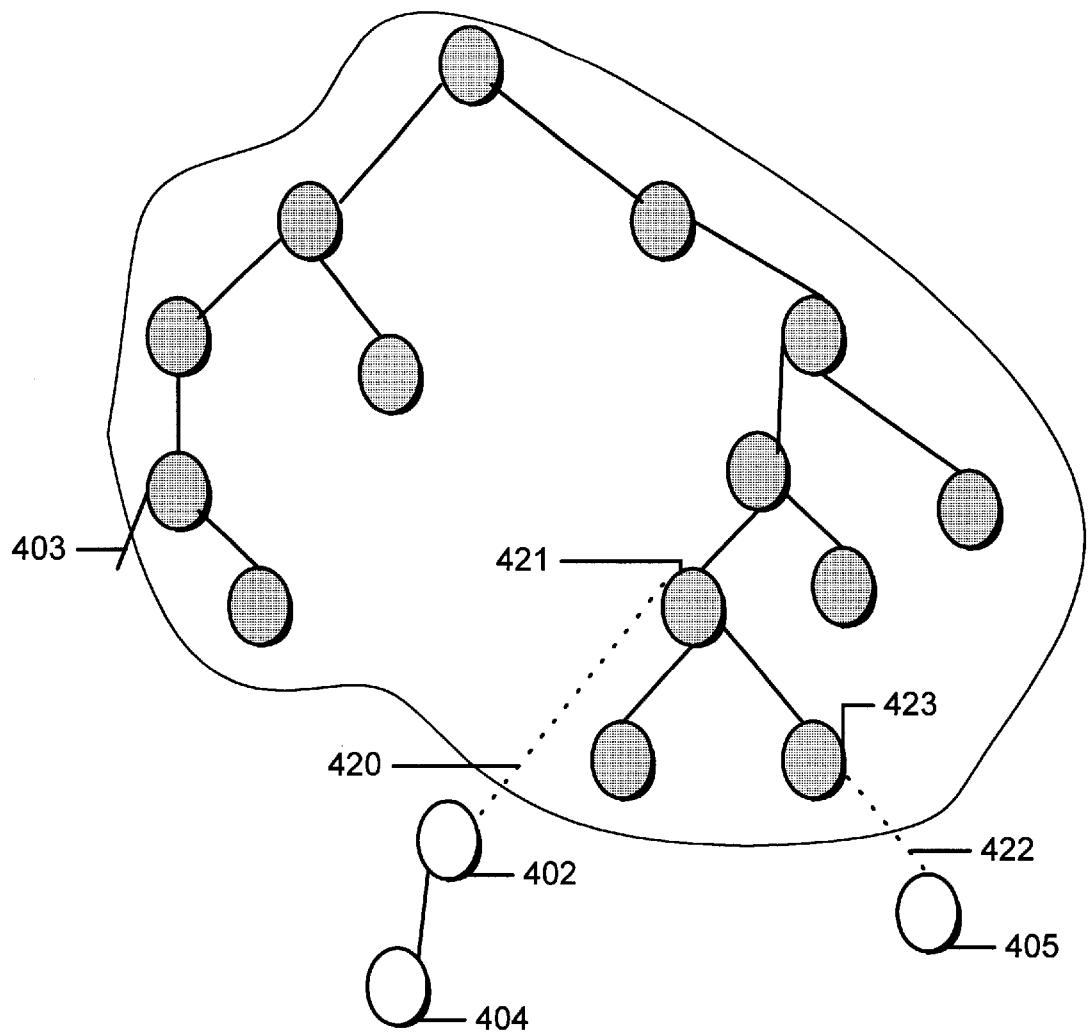
FIG. 6 illustrates an alternative change in topology relative to FIG. 5, to be managed according to the present invention.

FIGS. 4, 5 and 6 illustrate a tree topology and changes to a tree topology for the purpose of illustrating certain functions of the present invention. Thus, in FIG. 4, a spanning tree includes a root bridge 400 within a tree of bridges indicated by the cloud 401. A bridge 402 is also coupled to the tree across link 403. Descendant bridges 404 and 405 are coupled to bridge 402. Operation of the protocol according to the present invention can be understood considering a failure of link 403, and a reconfiguration as shown in FIG. 5, and alternatively as shown in FIG. 6. Thus, the cloud 401 remains substantially intact in the example of FIG. 5. However, bridge 402 now connects across link 410 to bridge 411 within the cloud 401. Bridges 404 and 405 remain connected to bridge 402.

A minimum cost spanning tree has the property that if a node is removed from one branch of the tree and put under another branch, as illustrated in FIGS. 4 and 5, then reconfiguration and recalculation of the topology to yield a minimum cost spanning tree will only effect the downstream nodes from the original node that was moved. That is, it will only effect downstream nodes 404 and 405. These nodes 404 and 405 that are descendants of the original node 402 may choose to remain connected to the original node if it still provides the least root path cost. Alternatively, they may choose to move and hang off other branches of the tree that provide a better root path cost. Thus, as shown in FIG. 6, bridge 402 after the breaking of link 403 may reattach itself across link 420 to bridge 421. Bridge 404 may remain connected to bridge 402 in this case. However, bridge 405 may connect across link 422 to bridge 423. In either case, this operation does not disturb those nodes in the tree that are not descendants of node 402. However, the forwarding databases of certain nodes in the tree need to be updated in response to the change in topology. The bridged LAN spanning tree, bridges are connected through the root ports and designated ports. An edge in such a tree connects the designated port of a parent bridge to the root port of the descendant bridge. Failure of a link in such a network will result in the root port failure of the descendant bridge. This failure is obvious when the parent bridge and the descendant bridge are connected by a point-to-point link. This failure is observed by absence of periodic configuration bridge protocol data units that are sent by the root. The observation is made on the descendant bridge through its root port. This message is received by a bridge on its root port and relayed on all the designated ports which lead downstream. The latter observation is useful when the parent bridge and descendant bridge are connected through a repeater so that a link failure does not directly result in root port failure on a descendant bridge.

When a bridge detects root port failure, it can choose a backup root port from among ports in the alternate port role, and connect the tree via the backup root port. The backup root port chosen is one of the remaining ports on the bridge and should provide the best root path cost. This selection could be done based on learning and remembering the best root path cost achievable through each of the other ports during the spanning tree configuration, and then selecting the best of them. Alternatively, this information could be learned dynamically when needed. Once the backup root port is chosen, the topology change notification is sent to the downstream bridges through designated ports on the original bridge. Based on the information held by them, the downstream bridges that receive this notification through their ports may either choose to stay with the original parent if it still provides the best root path cost, or repeat the root port selection process used by the parent. These descendant bridges subsequently propagate this information downstream and the process is repeated until all bridges downstream have received the topology change notification and adjusted their root ports as desired. During this whole process of root port selection and adjustment, a loop free spanning tree topology is maintained and the notification propagates as fast as the bridges can process it.

When the original bridge moves the root port, it moves the addresses learned through the original root port to the new root port without waiting for relearning. In other words, the set of addresses associated with the root port including stations that are not descendants of the original bridge do not need to be refreshed in the spanning tree. Only addresses of stations downstream from the original bridge (sets of addresses associated with designated ports on the bridge undergoing the change) need to be refreshed at various locations in the tree. These addresses might appear to have moved with respect to the spanning tree. These addresses will be automatically refreshed and relearned correctly by the intervening bridges when the stations transmit packets. The process of refreshing these sets of addresses in the tree is based on actively signaling affected bridges in some embodiments described below.

Therefore, the bridge protocol entity 113 of FIG. 3 implements learning modifications for high availability tree. When topology changes in a spanning tree of the prior art resulting in addition/movement of a branch, the standard algorithm flushes the memory of all the bridges in the tree using a fast timer. These bridges then relearn the address. In the meantime, data packets are flooded throughout the spanning tree consuming bandwidth.

In a spanning tree, a port plays one of the following roles:
root
designated
alternate
disabled This results in a finite number of state transitions as far as a bridge port is concerned. These transitions occur as a result of addition/removal of a link and receiving protocol information on a port. Careful use of the effects of role changes on the overall behavior of the spanning tree results in significant learning improvement according to the present invention, and thus minimizes flooding.

Representative events that cause port role transitions and their effects on high availability tree along with improved learning are described below:

Root Port Failure

If a root port fails on a bridge protocol entity BPE 113, one of the alternate (blocked) ports providing the next best root information becomes the root port (alternate->root). The original root port becomes disabled (root->disabled) while the new root port goes to forwarding immediately keeping the tree simply connected. The inferior root information (as a result of making an alternate port the root port) is propagated to all the designated ports by sending a BPDU, for example. The addresses learned on the old root port are transferred to the new root port since whoever was not a descendant of the BPE 113 is reachable through the new root port now. The addresses learned on the designated ports are flushed since as a result of receiving the inferior root port information, the downstream bridges may move and attach to other branches on the tree invalidating the learned sets of addresses associated with designated ports.

Since the BPE 113 is detaching from the original upstream BPE's, the upstream BPE's should flush from their database the sets of addresses associated with their designated ports including the addresses accessible through BPE 113 and its descendants, because they are no longer available through their connecting designated port.

If the failed root port had a point-to-point link with the upstream neighbor (connected via its designated port), the root port failure on this bridge results in a designated port failure on the upstream bridge (designated->disabled). The upstream designated port thus detects the transition in the downstream bridge, and becomes disabled too, flushing the learned addresses. The upstream bridge then propagates a message on its root port requesting its upstream bridges to flush their learning on the respective receiving designated ports. This process is repeated until the message reaches (and is consumed by) the root bridge. This message is referred to as a Flush Designated FD message and follows the path 440, 441, 442 of FIG. 5. Note that may not be the most efficient flushing since we might be flushing more addresses than required (as we go up the tree, the number of addresses learned increases). Thus, the flushing process can further be optimized by including a list of descendant MAC addresses in the "flush designated" message that is sent upstream by a bridge, to which the upstream bridges respond by flushing only addresses in the message.

If the failed root port was connected to upstream bridge(s) through a shared segment instead, detection of the failed root port by upstream neighbors (and flushing of addresses) is less simple. Failure of a root port in this case does not result in any visible change as far as the upstream bridges are concerned. One could deploy techniques like "split horizon with poison reverse" to meet this challenge. Essentially, bridges (designated bridges in particular) keep track of all the neighbors on a segment. These neighbors respond to periodic hello (configuration) messages originated by the designated bridge keeping the list up-to-date. A designated bridge detects the absence of such a response and proceeds to the flush designated process described above. This requires keeping lot of state about neighbors, increased protocol traffic, and timer dependant delays.

Another technique to detect a root port failure on a shared link is described below:

A bridge knows the identity (bridge id) of the upstream designated bridge on a root port. It derives the MAC address from this bridge id. When this bridge attaches to a new branch, it sends a "start flush designated" message to the root bridge including the MAC address of the upstream designated bridge/port on the source branch. When the root bridge receives this message, it propagates this message to the designated port(s) leading to the specified MAC address (to all the designated ports if unknown). The downstream bridges repeat this process until the message reaches the bridge whose MAC address was specified. Alternatively this message can be sent to the MAC address of the upstream designated bridge on the source branch directly. The specified bridge then starts the "flush designated" process on its upstream branch as described before.

When a BPE attaches to a new branch in the tree, the upstream BPE's need to flush the memory of upstream BPE's regarding descendants of the BPE, in the sets of addresses associated with the respective root ports on the upstream bridges to the root. These upstream BPE's might have reached descendants of the moved BPE through their root ports before the change. These descendants must now be reached through the designated ports of the upstream bridges instead to avoid disconnectivity (where packets are wrongly routed to the original branch). This is done by sending a "flush root" FR message on the new root port to the upstream designated bridge/port (not to all the bridges on the upstream segment) instructing it to flush the addresses learned on its root port. The upstream bridge then propagates this message further upstream until it reaches and is consumed by the root bridge. Thus the flush root FR message follows the path 445, 446, 447, 448, 449, in FIG. 5. Note that this is not the most efficient flushing since we might be flushing a superset of addresses than what is required. We can achieve optimization by including the set of MAC addresses in the "flush root" message.

Link Addition

If a link is added, the port becomes designated (alternate->designated) and goes through waiting to avoid any loops. The root information is transmitted on the connected segment. The port starts learning addresses from the scratch.

Receiving Information on a Root Port If inferior information is received on a root port from the designated bridge/port, root port selection takes place on the receiving bridge. If one of the alternate ports becomes the root port, it goes to forwarding immediately. If the old root port becomes designated now, it goes through waiting to avoid loops. A root port to designated port transition is actually equivalent to root->alternate->designated transition. Alternatively an alternate port becomes the root port and goes through waiting to avoid any loops and if the old root port becomes designated now, it goes to forwarding immediately. The important point is that the old root port and new root port are not in forwarding simultaneously until this topology change information has been propagated to affected bridges. The new information is transmitted on all the designated ports. If the root port changes, addresses are transferred from the old root port to the new root port. Since we are receiving this information from the upstream designated bridge/port which would have corrected the learning on upstream source branch, we just need to fix learning on the target branch. The addresses learned on the root ports of upstream designated bridges on the target branch are flushed using the "flush root" process as described above in "Root Port Failure". Also addresses learned on all the designated ports are flushed because our downstream bridges might move after receiving inferior information from us.

If better information is received on a root port, it is accepted and recorded. Designated ports selection takes place. If one of the alternate ports becomes designated (altemate->designated) as a result, it goes through waiting to avoid any loops. The new information is transmitted on all the designated ports. The new designated port starts learning addresses from the scratch.

Receiving Information on a Designated Port

If better information is received on a designated port, the receiving port ceases to be designated on the connected segment. Root port selection takes place. If the receiving port becomes the root port (designated->root), it goes to forwarding immediately. If the old root port becomes designated now, it goes through waiting to avoid any loops. Alternatively, the receiving port becomes the root port and goes through waiting to avoid loops and if the old root port becomes designated now, it goes to forwarding immediately. The important point is that the old root port and new root port are not in forwarding simultaneously until this topology change information has been propagated to affected bridges. The new information is transmitted on all the designated ports. If the root port changes, addresses learned on the original root port are moved to the new root port. Learning is fixed on the source and target upstream branches as described under "Root Port Failure" above using both the "flush root" and "flush designated" processes. If the old root port becomes designated now, the addresses are flushed and the port starts learning addresses again.

If inferior information is received on a designated port, the bridge responds with the correct (better) information. No change in the learning takes place.

Receiving Information on an Alternate Port

If inferior information is received on an alternate port from the designated port, it is recorded. If the receiving port should become designated as a result, it transmits better information on the connected segment and goes through waiting to avoid any loops. The port also starts learning addresses now.

If better information is received on an alternate port, it is recorded. If the receiving port becomes the root port as a result, it goes to forwarding immediately. The designated port selection takes place. If the old root port becomes designated, it goes through waiting to avoid any loops. Alternatively the new root port goes through waiting and the old root port becomes designated and goes to forwarding immediately. The new information is transmitted to all the designated ports. If the receiving port becomes the root port, addresses are transferred from the original root port to the new root port. Memory of upstream bridges on the source and target branches is flushed as described under "Root Port Failure" using both the "flush designated" process on the source branch, and the "flush root" process on the target branch. If the old root port becomes designated, addresses are flushed and the port starts learning them again.

Convergence Time

Addition a point-to-point link causes immediate switch over to a better path (if any) on every bridge. Likewise, failure of a point-to-point link causes immediate switch over to an inferior path, if any, on every bridge. Immediate switch over does not result in loops. However, some packets might get duplicated (on source and destination branch). The total time taken to converge is dependent on the propagation time and processing delay experienced by downstream bridges and the time it takes for upstream bridges to flush their learned addresses. In the most optimistic case where a link addition or a link failure does not result in any root path change for downstream bridges (relative to the changing bridge), addresses will be flushed and full connectivity will be restored in Max (N1, N2)*(propagation time+processing time)

Where Ni is the depth of the bridge in the source branch and N2 is the depth of the bridge in the destination branch where change occurred. This is the time taken to flush the filtering database in upstream bridges to the Root.

Accordingly, FIGS. 7 and 8 illustrate processes executed on a network device which includes a protocol entity providing the learning modifications of the present invention. Thus, in FIG. 7, the logic process is illustrated in the protocol entity for a root port change on the local bridge. The process begins at block 700 upon detection of a root port change. First, a new root port is selected (block 701). The new root port transitions to the forwarding state (block 702). This transition is preferably an immediate transition as set forth above. However, alternative implementations may use the standard process involving the transitional listening and learning states.

After the new root bridge transitions to the forwarding state, the old root port forwarding data is mapped to the new root port (block 703). This process may involve simply changing entries in a database which associates MAC addresses with ports on the bridge, or it may involve physically moving MAC addresses from one location in the database to another location in the database as suits a particular implementation. The database may be implemented in a single memory, or distributed to separate memories associated with respective ports. A wide variety of memory architectures could be utilized for implementing the forwarding database. The technique of transferring entries from one port to another thus, will depend on the implementation of the database in a particular situation.

After mapping the forwarding data from the old root port to the new root port in block 703, a bridge protocol data unit packet is sent on designated ports with the new root path cost data. This allows the descendant bridges to recompute their spanning tree configuration if necessary (block 704). Next, the forwarding data on the designated ports is flushed to allow for the possibility that descendant bridges will reconfigure (block 705).

Next a bridge protocol data unit is sent on the new root port to the new designated bridge up the target branch of the tree, signaling it to flush or update its root forwarding data (block 706). This notification is propagated up the tree until it is consumed by the root, allowing the bridges to update their forwarding databases to reflect that the bridge which changed its position in the tree is no longer accessible through the root port. Finally, the bridge protocol data unit is sent on the new root port destined to the old designated mate, that is for example destined to bridge 430 in FIG. 5, signaling the change. This allows bridge 430 to update its designated port data to indicate that previously descendant bridges are longer accessible through the designated port. Bridge 430 then propagates a message up the tree through its root port to its designated bridge signaling the change, which responds by flushing the set of addresses associated with the receiving designated port, and by propagating the message up the source branch of the tree. This message is consumed at the root 400.

Block 707 may not be necessary on networks that support only point-to-point links.

FIG. 8 illustrates the process executed by the protocol entity when it receives a notification that its downstream bridge suffered a root port failure (block 800). In this case, it flushes the forwarding data for its descendants on its designated ports (block 801), and sends a protocol data unit on its root port up the tree to flush or update the designated forwarding data (block 802). This "flush designated" process propagates the protocol data unit until it is consumed by the root.

The process described in FIGS. 7 and 8 can be characterized as a process that is executed when a port gains connectivity in order to flush the root ports on target branch, and the process executed when a port loses connectivity to flush the designated ports on the branch to the root on which the connectivity was lost. According to an alternative approach, the activity is initiated by a port gaining connectivity. This action causes the root ports on the target branch to be flushed and the designated ports on the source branch to be flushed by a messaging algorithm initiated on the target branch. Using either approach, an FR up, FD up messaging algorithm or an FR up, FD down messaging algorithm could be utilized. According to an FR up, FD up messaging algorithm, the FR messages originated by the changing bridge. The FD message is originated by the changing bridge, or the upstream bridge that loses connection to the changing bridge. It is originated by the upstream bridge if the upstream bridge was connected to a changing bridge on a point-to-point link detected at loss of light, or if the changing bridge sent a signal indicating a root port failure on a shared segment, or initiated by the changing bridge when the corresponding port becomes an alternate port but the physical link to the upstream bridge is intact. Both the FR and FD messages are consumed by the root bridge. Both the FR and FD messages can be qualified by including a list of MAC addresses that need to be flushed. In the FR up, FD down approach, the changing bridge originates the FR message, and this message is translated to an FD message by the root bridge. The root bridge can suppress the FD message on a link on which it received the FR message. The FD message can be qualified using a label for the terminating bridge, or bridge port, when the intervening bridge in this case flush only those ports that are in the path from the root bridge to the specified bridge or bridge port. Both the FR and FD messages can be qualified by including a list of MAC addresses that need to be flushed.

As mentioned above, in one embodiment, transitions of port states are also managed according to port role. See, co-pending U.S. patent application Ser. No. 09/141,803, entitled HIGH AVAILABILITY SPANNING TREE WITH RAPID RECONFIGURATION, filed on Aug. 28, 1998, by the same inventors, which was owned at the time of invention and is currently owned by the same assignee, and which is hereby incorporated by reference as if fully set forth herein.

FIG. 9A illustrates the enhanced transitions according to the present invention for point-to-point networks, including the transitions that depend on port role. It can be seen that for ports in the root port role, there are no listening or learning states. Listening or learning states are not required for a transition from the alternate port role to the root port role. FIG. 9B collapses the table in FIG. 9A to eliminate redundant states in the various roles.

In the tables of FIGS. 9A and 9B, X means event can't happen;—means no action is taken, i.e. no state changes or timer changes. The "footnotes" in the tables follow:

$^a$Start the forward delay timer;

$^b$Restart the forward delay timer;

$^d$Stop the forward delay timer;

$^{10}$This event caused if the new Root Port was not previously Forwarding, i.e. was Blocking, Listening, or Learning. Event covers "enable port" for disabled ports;

$^{11}$This event if the new Root Port was previously Forwarding. Event covers "enable port" for disabled ports.

Figure 10:
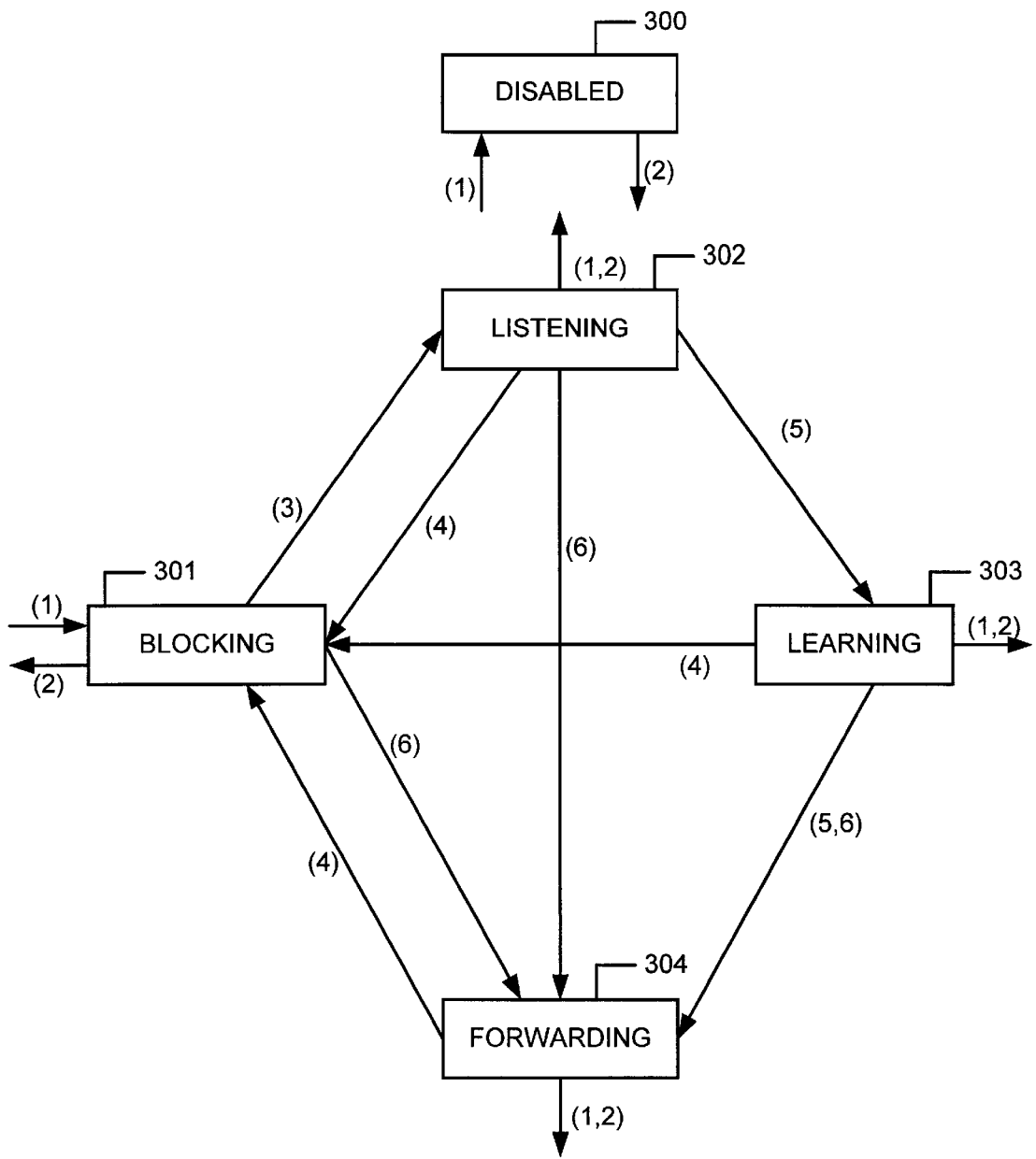
FIG. 10 is a port state diagram according to the present invention for bridge networks consisting of point-to-point LAN segments only.

FIG. 10 illustrates the state transitions represented in the FIG. 9B which occur according to the role to be assumed after the change, and the role before the change. Thus, in FIG. 10 the ports can assume a disabled state 300, a blocking state 301, a listening state 302, a learning state 303, and a forwarding state 304. These states behave just as defined in the specification for the 802.1D standard in the preferred embodiment. Transitions from the disabled state into an active state occur on transition (2) to the blocking state 301. Transitions out of the blocking state 301 into the disabled state 300 occur on transition (1). From the listening state 302, learning state 303 or forwarding state 304, any transition to become enabled (1) or become disabled (2), causes a transition into the disabled state 300. The disabled state 300 can be ignored for the purposes of the balance of the description of the present invention.

In FIG. 10, the transition (3) corresponds to a change in topology that requires the port to become a designated port, both in the condition that the new root port was not previously forwarding prior to the change, and in the condition that the new root port was previously forwarding prior to the change. This transition occurs from the blocking state on 301 to the listening state 302.

The transition (4) occurs when the port is to assume that alternate port role. In FIG. 10, this transition (4) occurs from any of the listening, learning or forwarding states 302–304 into the blocking state 301. The transition (5) occurs upon expiration of the forward delay timer. This transition occurs from the listening state 302 into the learning state 303, or from the learning state 303 into the forwarding state 304. The transition (6) occurs upon transition to the root port role from the alternate port role. The transition (6) occurs from the blocking, listening or learning states 301–303 into the forwarding state 304 without traversing any transitional states.

The management of state transitions according to port role in other embodiments supports multiple access media, as well as point to point links, according to processes for example described in the application incorporated by reference above.

The invention specifies the necessary changes to the transition of port states between the forwarding and blocking states as the spanning tree protocol changes the roles of the ports between the root port, designated port, alternate port, and backup port according to the present invention. The implementation of the present invention currently contemplated does not affect the standard protocol other than improving the state transitions within the bridge. Thus, an external observer would not tell the difference by observing the bridge protocol data units which are transmitted according to the spanning tree. Furthermore, it is not necessary for all bridges in the network to adopt the improved spanning tree algorithm of the present invention for implementation.

The spanning tree improvement described herein provides rapid restoration of physical conductivity. Further improvements for rapid reconfiguration of a spanning tree network involve controlling the contents of the filtering databases and the application of multicast filters and virtual LAN filters.

When the root port moves on a bridge, the associated filtering database need to be updated. When an alternate port becomes the new root port, the filtering database for the old root can be utilized for updating the database according to a variety of strategies.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. For a network comprising a plurality of local area network LAN segments, a network device comprising:
   a plurality of ports coupled to LAN segments in the network;
   topology management resources which manage the plurality of ports according to a spanning tree algorithm, to set an active topology for the plurality of ports; and
   resources, responsive to the active topology, which forward frames incoming through ports in the plurality of ports and which block forwarding of frames incoming through other ports in the plurality of ports, the resources including a forwarding database storing for the ports in the plurality of ports, respective sets of destination addresses of stations learned from frames incoming on respective ports, and wherein the topology management resources comprise
      logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and
      logic to update the forwarding database in response to changes in the roles, the logic including for a port changing from the alternate port role to the root port role updating the forwarding database by transferring the set of addresses associated with the port in the root port role before the change to the port having the root port role after the change.

2. For a network comprising a plurality of local area network LAN segments, a network device comprising:
   a plurality of ports coupled to LAN segments in the network;
   topology management resources which manage the plurality of ports according to a spanning tree algorithm, to set an active topology for the plurality of ports; and
   resources, responsive to the active topology, which forward frames incoming through ports in the plurality of ports and which block forwarding of frames incoming through other ports in the plurality of ports, the resources including a forwarding database storing for the ports in the plurality of ports, respective sets of destination addresses of stations learned from frames incoming on respective ports, and wherein the topology management resources comprise
      logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and
      logic to update the forwarding database in response to changes in the roles;
      wherein the resources to forward frames incoming on a particular port, includes logic coupled to the forwarding database to block packets having destination addresses in the set of addresses associated with the particular port.

3. For a network comprising a plurality of local area network LAN segments, a network device comprising:
   a plurality of ports coupled to LAN segments in the network;
   topology management resources which manage the plurality of ports according to a spanning tree algorithm, to set an active topology for the plurality of ports; and
   resources, responsive to the active topology, which forward frames incoming through ports in the plurality of ports and which block forwarding of frames incoming through other ports in the plurality of ports, the resources including a forwarding database storing for the ports in the plurality of ports, respective sets of destination addresses of stations learned from frames incoming on respective ports, and wherein the topology management resources comprise
      logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles;
      logic to update the forwarding database in response to changes in the roles; and
      logic responsive to notification through a particular port in a designated port role that a port on a different network device accessible through the particular port has changed a port in the alternate port role to the root port role, to update the set of addresses associated with the port in the root port role in the network device to remove at least the addresses of stations accessible through the different network device.

4. The network device of claim 3, further including logic to forward the notification through the port in the root port role in the network device.

5. The network device of claim 3, wherein the topology management resources include resources to indicate whether the topology management resources act as the root of the active topology, and if the topology management resources do not act as the root, then to forward the notification through the port in the root port role in the network device.

6. For a network comprising a plurality of local area network LAN segments, a network device comprising:
   a plurality of ports coupled to LAN segments in the network;
   topology management resources which manage the plurality of ports according to a spanning tree algorithm, to set an active topology for the plurality of ports; and
   resources, responsive to the active topology, which forward frames incoming through ports in the plurality of ports and which block forwarding of frames incoming through other ports in the plurality of ports, the resources including a forwarding database storing for the ports in the plurality of ports, respective sets of destination addresses of stations learned from frames incoming on respective ports, and wherein the topology management resources comprise
      logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and logic to update the forwarding database in response to changes in the roles;

wherein the topology management resources include resources to determine that a port on a different network device accessible through a particular port in the designated port role has become disconnected from the particular port, and if the port on a different network device has become disconnected, then to update the set of addresses associated with the particular port by removing at least the set of addresses accessible through the different network device from the set of addresses associated with the particular port, and to forward a notification through the port in the root port role in the network device.

7. The network device of claim 6, wherein the resources to determine that a port on a different network device accessible through a particular port in the designated port role has become disconnected from the particular port comprise logic to receive a message addressed to the topology management resources carrying a notification of the disconnection.

8. The network device of claim 6, wherein the resources to determine that a port on a different network device accessible through a particular port in the designated port role has become disconnected from the particular port comprise logic to poll network devices accessible through ports in the designated port role to detect the disconnection.

9. The network device of claim 7, including logic responsive to notification through a particular port in a designated port role that a port on a different network device has changed to a root port role for the different network device to determine a second network device having a port in a designated port role which had been coupled to a port in the root port role on the different network device before the change, and to notify the second network device that the different network device had been disconnected.

10. The network device of claim 9, wherein the resources to notify the second protocol entity that the different network device had been disconnected, comprise logic to determine an address of the second network device from the different network device, and to send a message to the second network device.

11. For a network comprising a plurality of local area network LAN segments, a network device comprising:

a plurality of ports coupled to LAN segments in the network;

topology management resources which manage the plurality of ports according to a spanning tree algorithm compliant with IEEE Standard 802.1D, to set an active topology for the plurality of ports; and resources, responsive to the active topology, which forward frames incoming through ports in the plurality of ports and which block forwarding of frames incoming through other ports in the plurality of ports, the resources including a forwarding database storing for the ports in the plurality of ports, respective sets of addresses of stations learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles;

logic to compute states for ports in the plurality of ports in response to the parameters, including placing the port providing the root port role in a forwarding state, placing the one or more ports providing the designated port roles in a forwarding state, and placing the one or more ports providing the alternate port roles in a blocking state;

logic to manage transition of the states of the ports in the plurality of ports from a blocking state to a forwarding state in response to a change in the active topology, including for a port changing from the alternate port role to the root port role updating the forwarding database by transferring the set of addresses associated with the port in the root port role before the change to the port having the root port role after the change.

12. The network device of claim 11, wherein the resources to forward frames incoming on a particular port, includes logic coupled to the forwarding database to block packets having destination addresses in the set of addresses associated with the particular port.

13. The network device of claim 11, wherein logic to issue notification to other network devices in the network of changes in the roles, includes logic to notify devices about the change through the port in the root port role after the change.

14. The network device of claim 11, including logic responsive to notification through a particular port in a designated port role that a port on a different network device accessible through the particular port has changed a port in the alternate port role to the root port role, to update the set of addresses associated with the port in the root port role in the network device to remove at least the addresses of stations accessible through the different network device.

15. The network device of claim 14, further including logic to forward the notification through the port in the root port role in the network device.

16. The network device of claim 14, wherein the topology management resources include resources to indicate whether the topology management resources act as the root of the active topology, and if the topology management resources do not act as the root, then to forward the notification through the port in the root port role in the network device.

17. The network device of claim 11, wherein the topology management resources include resources to determine that a port on a different network device accessible through a particular port in the designated port role has become disconnected from the particular port, and if the port on a different network device has become disconnected, then to update the set of addresses associated with the particular port by removing at least the set of addresses of stations accessible through the different network device from the set of addresses associated with the particular port, and to forward a notification through the port in the root port role in the network device.

18. The network device of claim 17, wherein the resources to determine that a port on a different network device accessible through a particular port in the designated port role has become disconnected from the particular port comprise logic to receive a message addressed to the topology management resources carrying a notification of the disconnection.

19. The network device of claim 17, wherein the resources to determine that a port on a different network device accessible through a particular port in the designated port role has become disconnected from the particular port comprise logic to poll network devices accessible through ports in the designated port role to detect the disconnection.

20. The network device of claim 18, including logic responsive to notification through a particular port in a designated port role that a port on a different network device has changed to a root port role for the different network device to determine a second network device having a port in a designated port role which had been coupled to a port in the root port role on the different network device before the change, and to notify the second network device that the different network device had been disconnected.

21. The network device of claim 20, wherein the resources to notify the second protocol entity that the different network device had been disconnected, comprise logic to determine an address of the second network device from the different network device, and to send a message to the second network device.

22. The network device of claim 11, including logic coupled with the forwarding database to learn addresses of end stations accessible through particular ports, and to add learned addresses to the respective set of addresses.

23. The network device of claim 22, including logic to remove a given address from a set of addresses associated with a particular port in the forwarding database, if a packet carrying the given address as a source address is not received on the particular port within an aging interval.

24. The network device of claim 11, wherein the network includes stations which are descendants accessible through ports in the designated port role, and stations which are not descendants accessible through the port in the root port role, and the forwarding database includes a set of addresses associated with the port in the root port role including addresses of stations which are not descendants, and respective sets of addresses associated with ports in the designated port role including addresses of descendants which are accessible through the respective ports.

25. The network device of claim 11, wherein the forwarding database includes entries including a MAC address and port identifier for the MAC address, and the logic to update the forwarding database includes logic to change the port identifier of entries in the forwarding database.

26. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, and including a forwarding database storing for the ports in the plurality of ports, respective sets of addresses of stations learned from frames incoming on respective ports, an improvement comprising:

storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, and identification of one or more ports in the plurality of ports for alternate port roles; and for a particular port changing from the alternate port role to the root port role, updating the forwarding database by transferring the set of addresses associated with the port in the root port role before the change to the port having the root port role after the change.

27. The improvement of claim 26, including for the particular port changing from the alternate port role to the root port role, causing transition from the blocking state to the forwarding state without requiring transition through the listening and learning states.

28. The improvement of claim 26, including signaling other network devices in the spanning tree protocol about the transition.

29. The improvement of claim 26, wherein the active topology includes a root device, and including sending a signal to other network devices accessed through the port in the root port role on said network device before the change up to the root device, to flush the set of addresses associated with respective ports in the designated port roles of addresses descendant from said network device.

30. The improvement of claim 26, wherein the active topology includes a root device, and including sending a signal to other network devices accessed through the port in the root port role on said network device after the change up to the root device, to flush the set of addresses associated with respective ports in the root port roles of addresses descendant from said network device.

31. The improvement of claim 26, wherein said network device comprises a protocol entity compliant with IEEE Standard 802.1D, and the active topology includes a root device, and including:

sending a signal to other network devices accessed through the port in the root port role on said network device before the change up to the root device, to flush the set of addresses associated with respective ports in the designated port roles of addresses descendant from said network device;

sending a signal to other network devices accessed through the port in the root port role on said network device after the change up to the root device, to flush the set of addresses associated with respective ports in the root port roles of addresses descendant from said network device.

32. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports; and resources, responsive to the active topology, which forward frames incoming through ports in the plurality of ports and which block forwarding of frames incoming through other ports in the plurality of ports, the resources including a forwarding database storing for the ports in the plurality of ports, respective sets of station addresses learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles;

logic to notify other network devices in the network which have forwarding databases needing to be updated in response to changes in the roles; and logic to update the forwarding database includes for a port changing from the alternate port role to the root port role updating the forwarding database by transferring the set of addresses associated with the port in the root port role before the change to the port having the root port role after the change.

33. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports; and resources, responsive to the active topology, which forward frames incoming through ports in the plurality of ports and which block forwarding of frames incoming through other ports in the plurality of ports, the resources including a forwarding database storing for the ports in the plurality of ports, respective sets of station addresses learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and logic to notify other network devices in the network which have forwarding databases needing to be updated in response to changes in the roles;

wherein the resources to forward frames incoming on a particular port, includes logic coupled to the forwarding database to block packets having destination addresses in the set of addresses associated with the particular port.

34. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports; and resources, responsive to the active topology, which forward frames incoming through ports in the plurality of ports and which block forwarding of frames incoming through other ports in the plurality of ports, the resources including a forwarding database storing for the ports in the plurality of ports, respective sets of station addresses learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles;

logic to notify other network devices in the network which have forwarding databases needing to be updated in response to changes in the roles; and logic responsive to notification through a particular port in a designated port role that a port on a different network device accessible through the particular port has changed a port in the alternate port role to the root port role, to update the set of addresses associated with the port in the root port role in the network device to remove at least the addresses of stations accessible through the different network device.

35. The network device of claim 34, further including logic to forward the notification through the port in the root port role in the network device.

36. The network device of claim 34, wherein the topology management resources include resources to indicate whether the topology management resources act as the root of the active topology, and if the topology management resources do not act as the root, then to forward the notification through the port in the root port role in the network device.

37. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports; and resources, responsive to the active topology, which forward frames incoming through ports in the plurality of ports and which block forwarding of frames incoming through other ports in the plurality of ports, the resources including a forwarding database storing for the ports in the plurality of ports, respective sets of station addresses learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and logic to notify other network devices in the network which have forwarding databases needing to be updated in response to changes in the roles, the logic including resources to indicate active status of the port in the root port role, such that an other network device on the first branch receives notification of the change by loss of indication of active status; and wherein the topology management resources include resources to determine that a port on a different network device accessible through a particular port in the designated port role has become disconnected from the particular port, and if the port on a different network device has become disconnected, then to update the set of addresses associated with the particular port by removing at least the set of addresses accessible through the different network device from the set of addresses associated with the particular port, and to forward a notification through the port in the root port role in the network device up the first branch of the tree.

38. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports; and resources, responsive to the active topology, which forward frames incoming through ports in the plurality of ports and which block forwarding of frames incoming through other ports in the plurality of ports the resources including a forwarding database storing for the ports in the plurality of ports, respective sets of station addresses learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and logic to notify other network devices in the network which have forwarding databases needing to be updated in response to changes in the roles, the logic including resources to indicate active status of the port in the root port role, such that an other network device on the first branch receives notification of the change by loss of indication of active status; and wherein the resources to determine that a port on a different network device accessible through a particular port in the designated port role has become disconnected from the particular port comprise logic to receive a message addressed to the topology management resources carrying a notification of the disconnection.

39. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports; and resources, responsive to the active topology, which forward frames incoming through ports in the plurality of ports and which block forwarding of frames incoming through other ports in the plurality of ports, the resources including a forwarding database storing for the ports in the plurality of ports, respective sets of station addresses learned from frames incoming on respective ports, and wherein the topology management resources comprise logic to compute parameters for managing the active topology, the parameters including an identification of a root of the network, identification of a port in the plurality of ports for a root port role to be used for a preferred path to the root, identification of one or more ports in the plurality of ports for designated port roles to be used for preferred paths between the root and respective LAN segments coupled to the one or more ports in the plurality of LAN segments, and identification of one or more ports in the plurality of ports for alternate port roles; and logic to notify other network devices in the network which have forwarding databases needing to be updated in response to changes in the roles, the logic including resources to indicate active status of the port in the root port role, such that an other network device on the first branch receives notification of the change by loss of indication of active status; and wherein the resources to determine that a port on a different network device accessible through a particular port in the designated port role has become disconnected from the particular port comprise logic to poll network devices accessible through ports in the designated port role to detect the disconnection.

40. The network device of claim 38, including logic responsive to notification through a particular port in a designated port role that a port on a different network device has changed to a root port role for the different network device to determine a second network device having a port in a designated port role which had been coupled to a port in the root port role on the different network device before the change, and to notify the second network device that the different network device had been disconnected.

41. The network device of claim 40, wherein the resources to notify the second network device that the different network device had been disconnected, comprise logic to determine an address of the second network device from the different network device, and to send a message to the second network device.

42. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, and including a forwarding database storing for the ports in the plurality of ports, respective sets of addresses of stations learned from frames incoming on respective ports, an improvement comprising: detecting a change in the active topology at a particular network device in the network, and causing a set of other network devices in the network to update their respective forwarding databases in response to the change, and in response to their respective positions in the active topology;

storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, and identification of one or more ports in the plurality of ports for alternate port roles; and for a particular port changing from the alternate port role to the root port role, updating the forwarding database by transferring the set of addresses associated with the port in the root port role before the change to the port having the root port role after the change.

43. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, and including a forwarding database storing for the ports in the plurality of ports, respective sets of addresses of stations learned from frames incoming on respective ports, an improvement comprising:

detecting a change in the active topology at a particular network device in the network, and causing a set of other network devices in the network to update their respective forwarding databases in response to the change, and in response to their respective positions in the active topology;

wherein the active topology includes a root device, and the step of causing a set of other network devices to update their respective forwarding databases includes sending a signal to other network devices accessed through the port in the root port role on said network device before the change up to the root device, to flush the set of addresses associated with respective ports in the designated port roles of addresses descendant from said network device.

44. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, and including a forwarding database storing for the ports in the plurality of ports, respective sets of addresses of stations learned from frames incoming on respective ports, an improvement comprising:

detecting a change in the active topology at a particular network device in the network, and causing a set of other network devices in the network to update their respective forwarding databases in response to the change, and in response to their respective positions in the active topology;

wherein the active topology includes a root device, and the step of causing a set of other network devices to update their respective forwarding databases includes sending a signal to other network devices accessed through the port in the root port role on said network device after the change up to the root device, to flush the set of addresses associated with respective ports in the root port roles of addresses descendant from said network device.

45. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, and including a forwarding database storing for the ports in the plurality of ports, respective sets of addresses of stations learned from frames incoming on respective ports, an improvement comprising:

detecting a change in the active topology at a particular network device in the network, and causing a set of other network devices in the network to update their respective forwarding databases in response to the change, and in response to their respective positions in the active topology;

wherein said network device comprises a protocol entity compliant with IEEE Standard 802.1D, and the active topology includes a root device, and the step of causing a set of other network devices to update their respective forwarding databases includes:

sending a signal to other network devices accessed through the port in the root port role on said network device before the change up to the root device, to flush the set of addresses associated with respective ports in the designated port roles of addresses descendant from said network device;

sending a signal to other network devices accessed through the port in the root port role on said network device after the change up to the root device, to flush the set of addresses associated with respective ports in the root port roles of addresses descendant from said network device.

* * * * *